(12) United States Patent
Goodman

(10) Patent No.: US 10,182,641 B1
(45) Date of Patent: Jan. 22, 2019

(54) TAPE MEASURE HOLDER

(71) Applicant: Keith B. Goodman, Pierre, SD (US)

(72) Inventor: Keith B. Goodman, Pierre, SD (US)

( * ) Notice: Subject to any disclaimer, the term of this patent is extended or adjusted under 35 U.S.C. 154(b) by 0 days.

(21) Appl. No.: 16/115,597

(22) Filed: Aug. 29, 2018

(51) Int. Cl.
*A45F 5/00* (2006.01)
*A45F 5/02* (2006.01)
*G01B 3/10* (2006.01)

(52) U.S. Cl.
CPC ............ *A45F 5/021* (2013.01); *G01B 3/1071* (2013.01); *A45F 2200/0575* (2013.01); *Y10S 224/904* (2013.01)

(58) Field of Classification Search
CPC ............. A45F 2200/0575; A45F 5/021; Y10S 224/904
USPC .......................... 224/904, 674, 677
See application file for complete search history.

(56) References Cited

U.S. PATENT DOCUMENTS

| | | | | |
|---|---|---|---|---|
| 984,402 A * | 2/1911 | Tuttle | ..................... | A45F 3/14 |
| | | | | 224/182 |
| D161,571 S * | 1/1951 | Dauenhauer | ................. | 224/163 |
| D193,678 S * | 9/1962 | Goldman | ...................... | 224/163 |
| D196,542 S * | 10/1963 | Zelnick | ..................... | 224/163 |
| D221,123 S * | 7/1971 | Nicholas | ........................ | D3/228 |
| 4,598,027 A * | 7/1986 | Johnson | .................... | A45F 5/02 |
| | | | | 156/212 |
| 4,690,316 A * | 9/1987 | Peterson | ................... | A45F 5/02 |
| | | | | 224/270 |
| 4,757,927 A * | 7/1988 | Rutty | ....................... | A45F 5/02 |
| | | | | 224/269 |
| 4,790,461 A * | 12/1988 | Stover | ...................... | A45F 5/00 |
| | | | | 224/234 |
| 4,821,933 A * | 4/1989 | Seber | ....................... | A45F 5/02 |
| | | | | 224/248 |
| 5,025,966 A * | 6/1991 | Potter | ...................... | A45F 5/02 |
| | | | | 224/183 |
| 5,100,037 A * | 3/1992 | Kopyta | ..................... | A45F 5/02 |
| | | | | 224/235 |
| D329,748 S * | 9/1992 | Ehlin | .......................... | D3/228 |
| 5,213,240 A * | 5/1993 | Dietz | ....................... | A45F 5/02 |
| | | | | 224/183 |
| 5,257,729 A * | 11/1993 | Silvernail | ................ | A45F 5/00 |
| | | | | 224/219 |
| D347,589 S * | 6/1994 | LaBate | ....................... | D10/32 |
| 5,388,741 A * | 2/1995 | Hillinger | ................. | A45F 5/02 |
| | | | | 206/349 |
| 5,450,994 A * | 9/1995 | Malinowski | ............. | A45F 5/02 |
| | | | | 224/249 |
| 6,161,742 A * | 12/2000 | Kiser | ....................... | A45F 5/02 |
| | | | | 224/251 |
| 6,193,119 B1 * | 2/2001 | Schwarm | ................ | A45F 5/021 |
| | | | | 224/197 |
| D452,071 S * | 12/2001 | Snider | .......................... | D3/228 |
| 6,457,252 B1 * | 10/2002 | Kershner | ............. | G01B 3/1071 |
| | | | | 33/755 |
| D530,908 S * | 10/2006 | Westcott | ...................... | D3/228 |
| D630,842 S * | 1/2011 | Fonseca | ...................... | D3/228 |
| 9,170,082 B2 * | 10/2015 | Moreau | ................ | G01B 3/1041 |
| 9,173,475 B2 * | 11/2015 | Blechman | ................ | A45F 5/02 |

(Continued)

*Primary Examiner* — Justin Larson
(74) *Attorney, Agent, or Firm* — The Iwashko Law Firm, PLLC; Lev Ivan Gabriel Iwashko

(57) ABSTRACT

A tape measure holder, including a loop to allow a belt to be threaded therethrough, an intermediary portion connected at a first end to an end of the loop, and a holding portion connected at a second end of the intermediary portion.

2 Claims, 2 Drawing Sheets

(56) References Cited

U.S. PATENT DOCUMENTS

| | | | | |
|---|---|---|---|---|
| 9,248,565 B1* | 2/2016 | Latham | ................... | B25H 3/006 |
| 10,070,713 B1* | 9/2018 | Carver | ....................... | A45F 5/02 |
| 2003/0074803 A1* | 4/2003 | Mutai | ....................... | A45F 5/02 |
| | | | | 33/768 |
| 2005/0133561 A1* | 6/2005 | Kimball | .................... | A45F 5/02 |
| | | | | 224/674 |
| 2005/0284909 A1* | 12/2005 | Munoz | .................... | A45C 1/04 |
| | | | | 224/674 |
| 2011/0139837 A1* | 6/2011 | Davis | ....................... | A45F 5/02 |
| | | | | 224/269 |
| 2018/0184791 A1* | 7/2018 | Davis | ....................... | A45F 5/022 |

* cited by examiner

TAPE MEASURE HOLDER

BACKGROUND

1. Field

The present general inventive concept relates generally to a tape measure holder.

2. Description of the Related Art

When working in construction or doing home improvement projects, there are a lot of tools required to be close in reach and readily accessible. A tape measure is such a common device that is important to have on hand, but it is easy for a tape measure to get lost among other appliances.

Therefore, there is a need for a device allows a user to conveniently attach a tape measure to a belt of the user.

SUMMARY

The present general inventive concept provides a tape measure holder to attach to a belt of a user.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a tape measure holder, including a loop to allow a belt to be threaded therethrough, an intermediary portion connected at a first end to an end of the loop, and a holding portion connected at a second end of the intermediary portion.

The holding portion may include a parallel portion to extend away from the intermediary portion in a direction parallel to the intermediary portion, a bent portion to bends away from the parallel direction, and a holding bar to allow the tape measure to be attached thereto.

The loop may be made of at least one of leather, plastic, rubber, and cloth.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
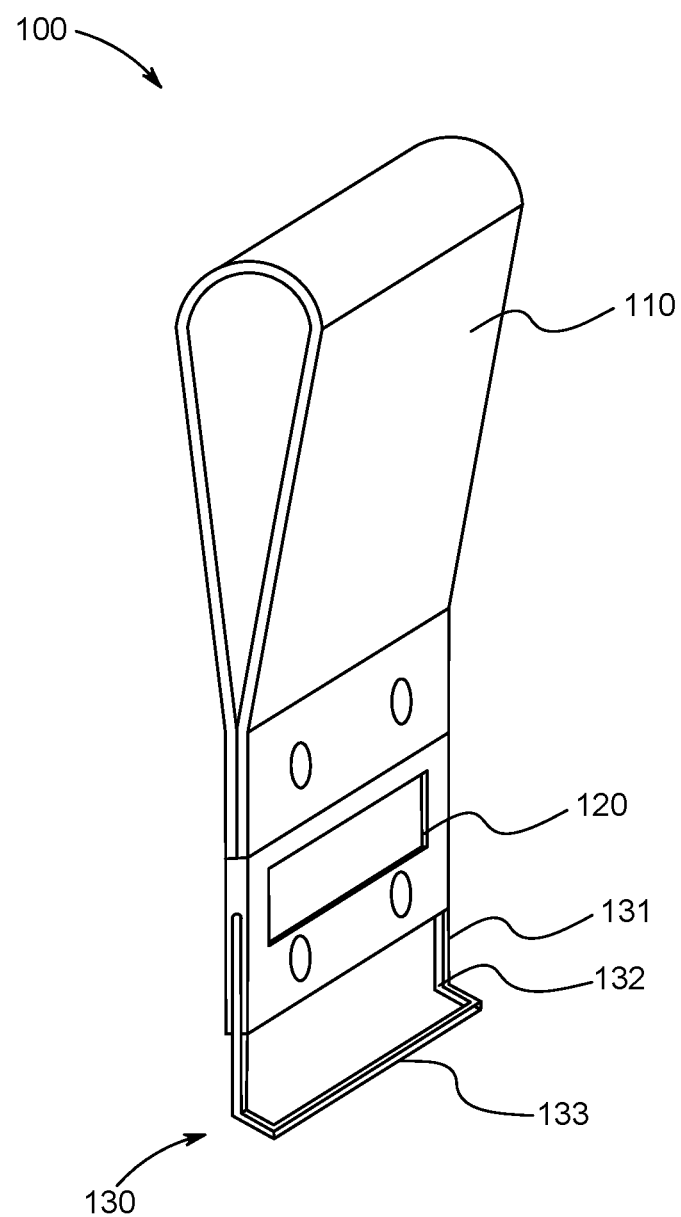
FIG. 1 illustrates a tape measure holder, according to an exemplary embodiment of the present general inventive concept.

FIG. 1 illustrates a tape measure holder 100, according to an exemplary embodiment of the present general inventive concept.

Figure 2:
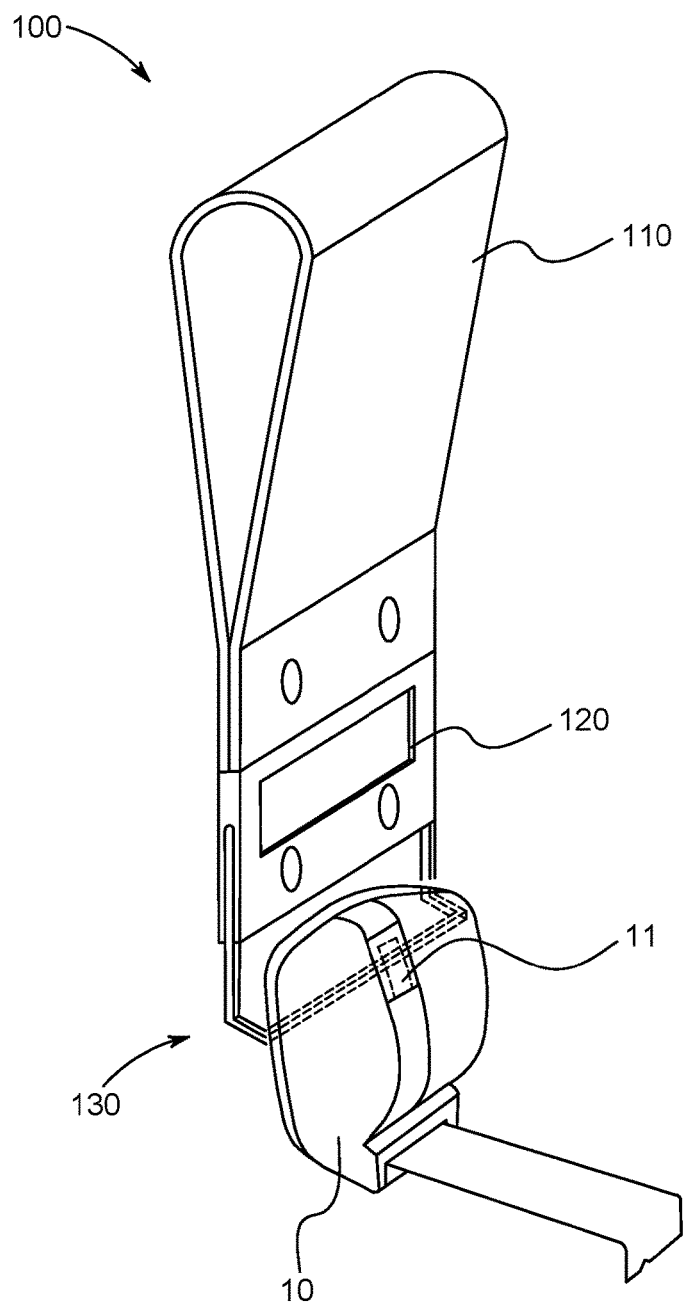
FIG. 2 illustrates a tape measure holder with a tape measure attached thereto, according to an exemplary embodiment of the present general inventive concept.

FIG. 2 illustrates a tape measure holder 100 with a tape measure 10 attached thereto, according to an exemplary embodiment of the present general inventive concept.

The tape measure holder 100 may include a loop 110, an intermediary portion 120, and a holding portion 130.

The loop 110 may be made from leather, plastic, rubber, cloth, or any other flexible material known to one of ordinary skill in the art.

The loop 110 may be designed to allow a belt to fit and be threaded therethough, such that the tape measure holder 100 may be worn by a user when the user is wearing the belt.

The intermediary portion 120 may be connected at a first end to an end of the loop 110, and may be made from metal, leather, plastic, rubber, cloth, or any other material known to one of ordinary skill in the art.

The holding portion 130 may be connected to a second end of the intermediary portion 120, and may be made from metal, leather, plastic, cloth, or any other material known to one of ordinary skill in the art.

The holding portion 130 may be specifically designed to have a shape of a loop, semi-rectangle, or any other shape that may allow a tape measure 10 to be attached thereto via a clip 11.

The holding portion 130 may have a parallel portion 131 that extends away from the intermediary portion 120 in a direction parallel to the intermediary portion 120, a bent portion 132 that bends away from the parallel direction to allow the tape measure 10 to not contact a leg of the user, and a holding bar 133 that allows the tape measure 10 to be attached thereto via the clip 11.

The bent portion 132 may be perpendicular to the parallel portion 131, or may be disposed at any angle with respect to the parallel portion 131.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A tape measure holder, comprising: a loop to allow a belt to be threaded therethrough; an intermediary portion connected at a first end to an end of the loop; and a holding portion connected at a second end of the intermediary portion; wherein the holding portion comprises a parallel portion to extend away from the intermediary portion in a direction both parallel to the intermediary portion and also below a terminal edge of the intermediary portion; a bent portion that bends away from the parallel portion; and a holding bar to allow the tape measure to be attached thereto.

2. The tape measure holder of claim 1, wherein the loop is comprised of at least one of leather, plastic, rubber, and cloth.

* * * * *